UNITED STATES PATENT OFFICE.

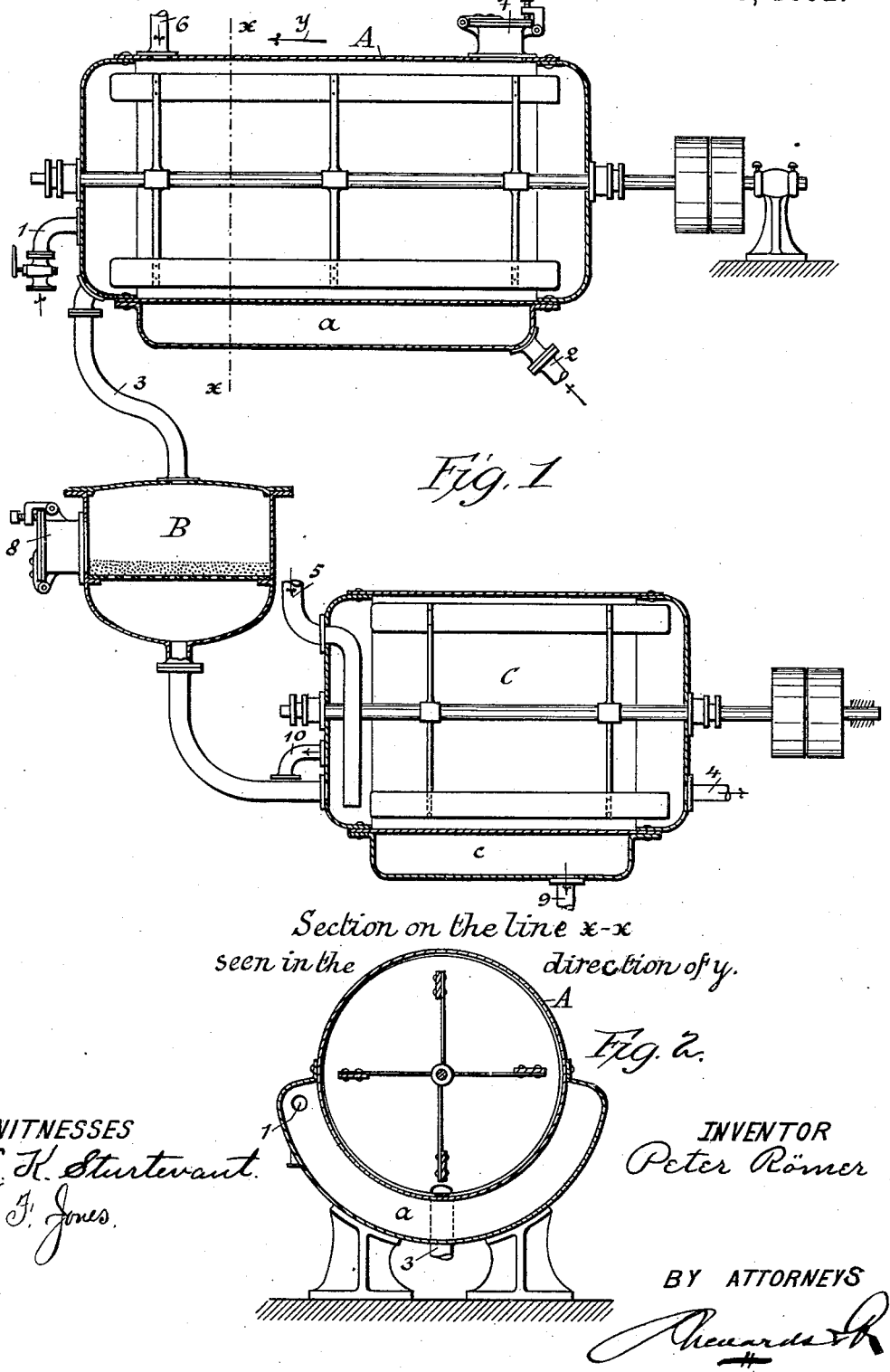

PETER RÖMER, OF BERNBURG, GERMANY.

PROCESS OF MAKING POTASSIUM CARBONATE.

SPECIFICATION forming part of Letters Patent No. 484,921, dated October 25, 1892.

Application filed February 12, 1892. Serial No. 421,324. (No specimens.)

*To all whom it may concern:*

Be it known that I, PETER RÖMER, chemist, a subject of the King of Prussia and German Emperor, residing at Bernburg, in the Duchy of Anhalt, German Empire, have invented certain new and useful Improvements in the Manufacture of Potassium Carbonate from Potassium Sulphate; and I do hereby declare the following to be a full, clear, and exact description of the invention, such as will enable others skilled in the art to which it appertains to make and use the same.

For carrying out this process various forms of apparatus may be employed. I prefer, however, to use an apparatus such as shown in the accompanying drawings, in which—

Figure 1 is a sectional view of the various parts of the apparatus, and Fig. 2 a cross-section of the cylinder A on line $x\ x$.

A is a cylinder, into which a solution of alkaline bichromate and alkaline sulphate is introduced through the tube 6. The lime for neutralizing this solution is put into the cylinder through the opening 7 and agitated by mechanical devices in such a manner that it becomes intimately mixed with the liquid and produces a thorough decomposition of the alkali sulphate. The lower part of the cylinder A is provided with a steam-jacket $a$, into which steam is introduced through tube 1 and led off through tube 2. The mixture of alkali chromate and finely-divided gypsum resulting from this process is led off through tube 3 and passed through filter B, in which the gypsum remains, and may occasionally be removed through the lateral opening 8, while the alkali chromate passes to cylinder C. Into the latter carbonic acid is introduced through the tube 5, in order to decompose the chromate of alkali and form alkali bichromate and alkali bicarbonate. The products of this reaction may be led off through pipe 4.

In order to facilitate the chemical process, the cylinder C may be provided in the same manner as the cylinder A with mechanical means for agitating the liquid. In order to keep the contents of the cylinder C at low temperature, a jacket $c$ is employed, through which cold water is passed by the pipes 9 10.

The object of the invention is the manufacture of potassium carbonate in the most advantageous manner.

It consists, mainly, of the following operations: first, production of potassium chromate from potassium sulphate; second, decomposition of the potassium chromate by carbonic acid into potassium bicarbonate and potassium bichromate, separation of these salts, and conversion of the bicarbonate into carbonate; third, purification of the obtained potassium carbonate containing chromium by the use of carbonic acid or alkaline reducing agents. These operations are effected very readily in aqueous solution, so that the losses of potassium which occur in other processes, in particular with the Leblanc potash process, are obviated.

I will describe, by way of example, a practical mode of carrying out the said manufacture of potassium carbonate according to my invention.

Potassium sulphate and potassium bichromate are dissolved in their molecular proportions, by weight, in as little water as possible, preferably at a temperature of from 60° to 80° centigrade, and are accurately neutralized by milk of lime, whereby potassium chromate and calcium sulphate are produced according to the following equation:

$$K_2SO_4 + K_2Cr_2O_7 + Ca(OH)_2 = 2K_2CrO_4 + CaSO_4 + H_2O.$$

The mass must not be heated to boiling-point, as otherwise combinations that are not readily soluble are produced, containing potassium, calcium, chromic acid, and sulphuric acid, at the expense of the first-formed potassium chromate. The gypsum produced is separated from the liquid obtained, which is a solution of potassium chromate. The latter contains calcium sulphate in solution, which is precipitated as calcium carbonate by means of potassium carbonate. In place of the hydrate of lime may also be employed baryta or strontia. The solution of the potassium chromate is then evaporated to a concentrated saturated solution of potassium chromate. This concentrated solution is then treated under effectual cooling with carbonic acid in a vessel provided with a stirring apparatus, either at atmospheric or higher pressure. The reaction will take place at atmospheric pressure if the solution is cooled; but if not first cooled a higher pressure is necessary, as the cooling augments the absorption of the carbonic acid. This operation can also be effected in the so-called "saturating" apparatuses, such as are employed in the ammonia-soda process. The process is preferably carried on with carbonic acid as pure as possible. This may, however, be used in the dilute form in which it is obtained from lime-kilns, or is regenerated in the hereinafter-described decomposition of the potassium bicarbonate. The carbonic acid effects the decomposition according to the formula—

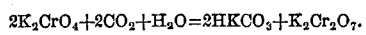

The potassium bichromate formed is precipitated, while potassium bicarbonate, together with small quantities of potassium bichromate, remain in solution. The liquid is then separated from the precipitated bichromate. After the precipitated potassium bichromate has been removed from the solution of potassium bicarbonate containing small quantities of potassium bichromate this solution is heated and concentrated, by which process one-half of the carbonic acid is driven off, so that the potassium bicarbonate is converted into potassium carbonate. Besides, the small quantities of potassium bichromate contained in the solution act upon the potassium carbonate, drive out the carbonic acid, and form potassium chromate according to the equation—

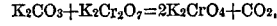

The liquid obtained in this way is therefore a concentrated solution of potassium carbonate with small quantities of potassium chromate. If this solution is again treated with carbonic acid, the potassium carbonate is again converted into bicarbonate and the potassium chromate into bichromate. The latter is precipitated in consequence of the considerable concentration of the solution. In this way, by repeatedly treating the liquid with carbonic acid, all potassium chromate is removed.

If, instead of the carbonic acid, reducing agents—for instance, potassium sulphide—are employed, the potassium chromate or potassium bichromate is decomposed, the oxygen converting the potassium sulphide into potassium sulphate, while the chromium is precipitated in the form of oxide of chromium.

Having now particularly described and ascertained the nature of my said invention and in what manner the same is to be performed, I declare that what I claim, and desire to get secured by Letters Patent of the United States, is—

1. The process for the production of potassium carbonate from potassium sulphate, consisting in, first, converting a mixture of equal molecules of potassium sulphate and potassium bichromate in aqueous solution below 100° centigrade by means of calcium hydrate or barium or strontium hydrate into potassium chromate, then saturating with carbonic acid the potassium-chromate solution in a concentrated and cooled condition, after separating therefrom the gypsum or barium or strontium sulphate, then separating the precipitated potassium bichromate from potassium bicarbonate produced, separating the potassium bichromate remaining in solution, and, lastly, obtaining from the remaining final lye by further evaporation a potassium carbonate containing chromium, substantially as described.

2. The process hereinbefore described, consisting in, first, converting a mixture of equal molecules of potassium sulphate and potassium bichromate in aqueous solution into potassium chromate, then saturating with carbonic acid the potassium-chromate solution, separating the precipitated potassium bichromate, obtaining from the final lye by evaporation potassium carbonate containing chromium, purifying the potassium carbonate by saturating with carbonic acid the cold aqueous solution, whereby potassium bicarbonate is separated, while the chromate remains in solution, and, finally, converting the potassium bicarbonate into carbonate by heating, substantially as described.

In testimony whereof I affix my signature in presence of two witnesses.

PETER RÖMER.

Witnesses:
 MARC M. ROTTEN,
 OSCAR SCHMIDT.